(12) United States Patent
Studer

(10) Patent No.: US 9,120,163 B2
(45) Date of Patent: Sep. 1, 2015

(54) PRESSURE MEDIUM CONTROLLED COUNTERBORE TOOL WITH A PISTON-CYLINDER UNIT

(71) Applicant: Ulf Heule, Balgach (CH)

(72) Inventor: Harry Studer, Balgach (CH)

(73) Assignee: Heule Werkzeug AG, Balgach (CH)

( * ) Notice: Subject to any disclaimer, the term of this patent is extended or adjusted under 35 U.S.C. 154(b) by 360 days.

(21) Appl. No.: 13/663,193

(22) Filed: Oct. 29, 2012

(65) Prior Publication Data
US 2013/0115019 A1 May 9, 2013

(30) Foreign Application Priority Data
Nov. 3, 2011 (DE) .......................... 10 2011 117 525

(51) Int. Cl.
*B23B 51/10* (2006.01)

(52) U.S. Cl.
CPC ........... *B23B 51/102* (2013.01); *B23B 2270/24* (2013.01); *Y10T 408/45* (2015.01); *Y10T 408/85* (2015.01); *Y10T 408/854* (2015.01); *Y10T 408/865* (2015.01)

(58) Field of Classification Search
CPC  B23B 51/102; B23B 2270/24; Y10T 408/45; Y10T 408/85; Y10T 408/865
USPC ..................................... 408/187, 56, 57, 147
IPC ...................................................... B23B 51/10
See application file for complete search history.

(56) References Cited

U.S. PATENT DOCUMENTS

| | | | | |
|---|---|---|---|---|
| 3,572,182 A | * | 3/1971 | MacDonald | 408/226 |
| 3,806,271 A | * | 4/1974 | Ishiguro et al. | 408/159 |
| 3,827,821 A | * | 8/1974 | Swenson | 408/59 |
| 4,729,699 A | * | 3/1988 | Frazzoli | 408/152 |
| 5,829,925 A | * | 11/1998 | Nordstrom | 408/57 |
| 5,848,860 A | * | 12/1998 | Steiner | 408/159 |
| 5,927,911 A | | 7/1999 | Steiner | |
| 6,238,150 B1 | * | 5/2001 | Yamada et al. | 408/224 |
| 6,270,295 B1 | * | 8/2001 | Hyatt et al. | 408/1 R |
| 7,322,778 B2 | * | 1/2008 | Woodruff et al. | 408/156 |
| 2005/0163579 A1 | * | 7/2005 | Gaiser | 408/156 |
| 2005/0220550 A1 | * | 10/2005 | Beier | 408/153 |
| 2010/0014933 A1 | | 1/2010 | Nedzlek | |
| 2010/0024220 A1 | * | 2/2010 | Heule et al. | 30/172 |
| 2010/0232895 A1 | | 9/2010 | Heule et al. | |

FOREIGN PATENT DOCUMENTS

| | | | | |
|---|---|---|---|---|
| DE | 2625861 | | 12/1976 | |
| DE | 102008004516 | | 8/2009 | |
| DE | 102008004516 A1 | * | 8/2009 | .............. B23B 51/10 |

(Continued)

OTHER PUBLICATIONS

EPO Search Report in corresponding EP Application No. 12005482.0-1262, Jan. 24, 2013.

*Primary Examiner* — Eric A Gates
(74) *Attorney, Agent, or Firm* — Wood, Herron & Evans, LLP

(57) ABSTRACT

A pressure medium controlled counterbore tool with one or multiple cutters for metal cutting, which can be actuated in their swivel position by supplying a pressure medium, wherein the actuation of at least one cutter is performed by at least one cutter by means of at least one piston-cylinder unit actuated by the pressure medium.

10 Claims, 4 Drawing Sheets

(56) References Cited

FOREIGN PATENT DOCUMENTS

| DE | 102008044802 | 3/2010 |
| DE | 102009007041 | 8/2010 |
| DE | 102009012996 | 9/2010 |
| GB | 1395639 A * | 5/1975 |
| JP | 09300117 A * | 11/1997 | ............ B23B 51/08 |
| WO | WO 9605928 A1 * | 2/1996 | ........... B23B 29/034 |

* cited by examiner

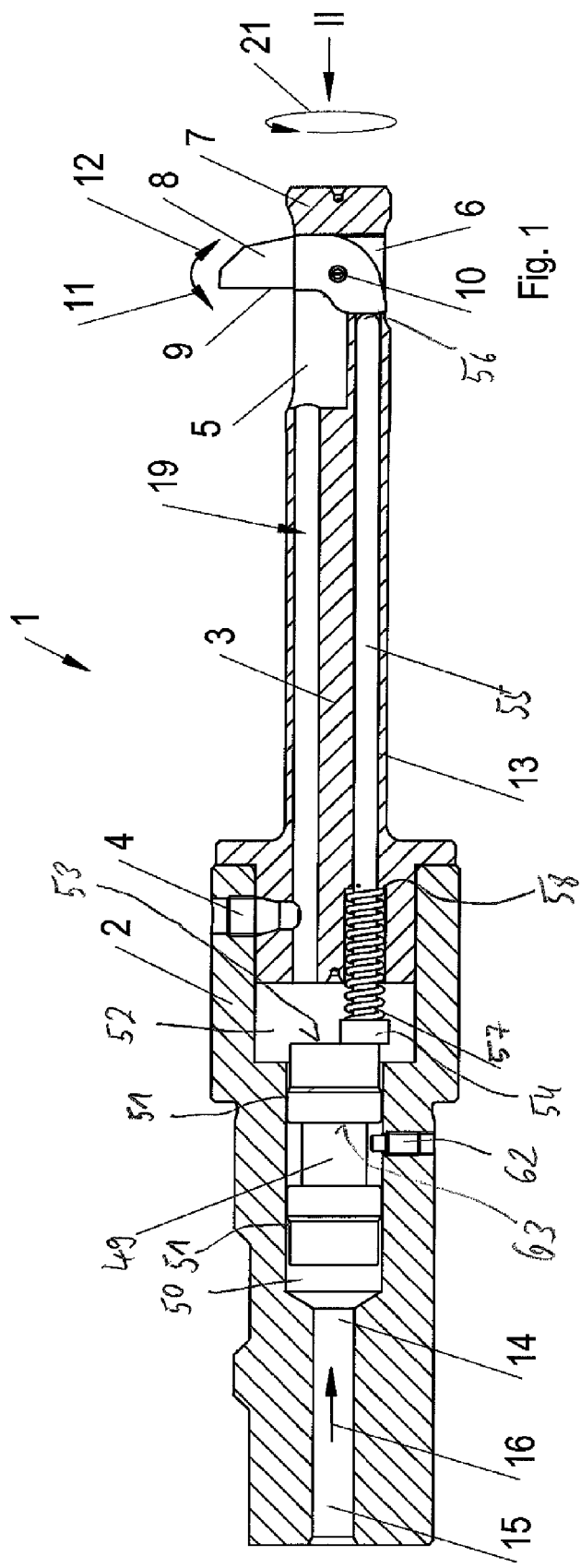
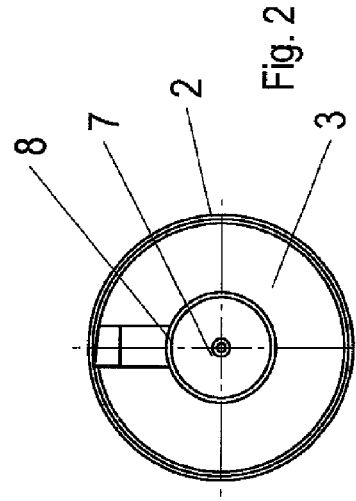

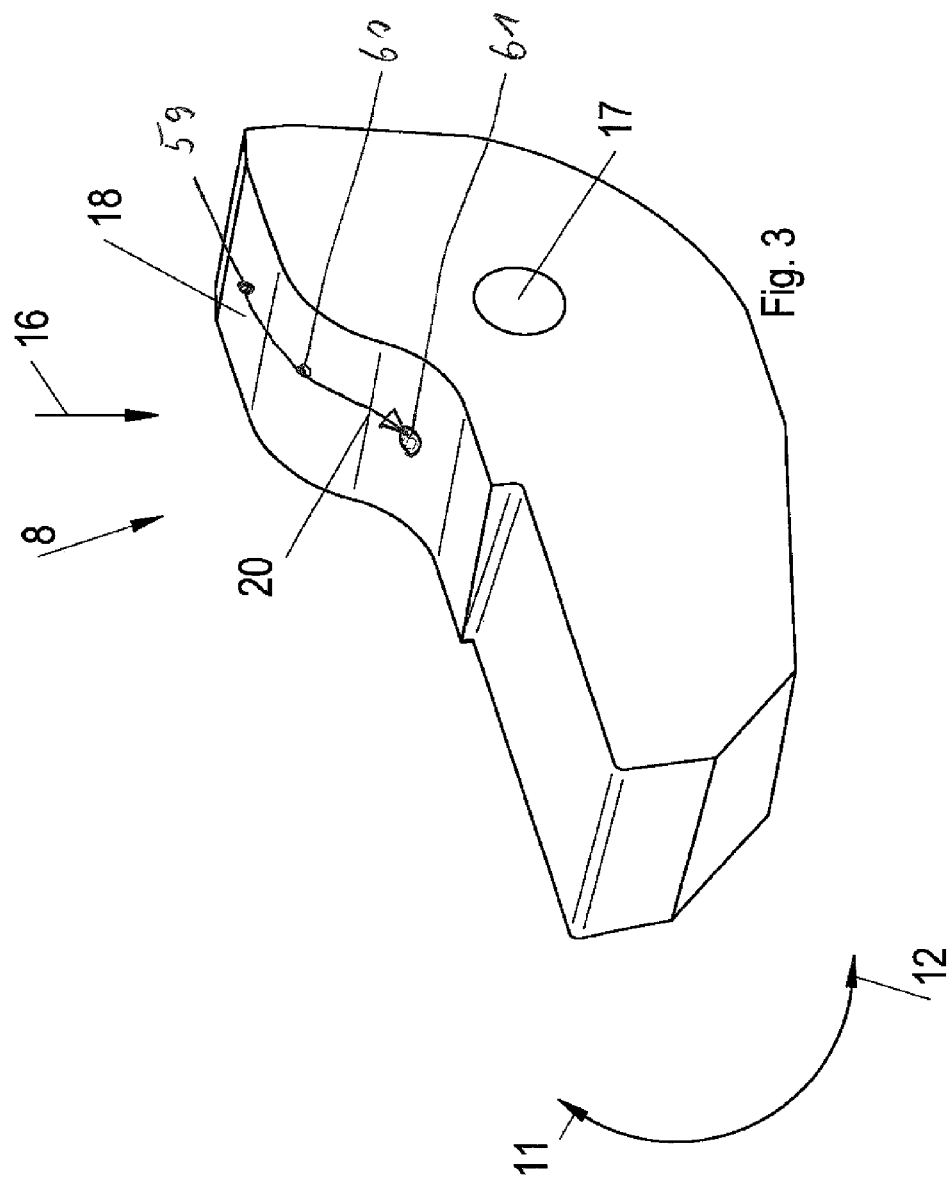

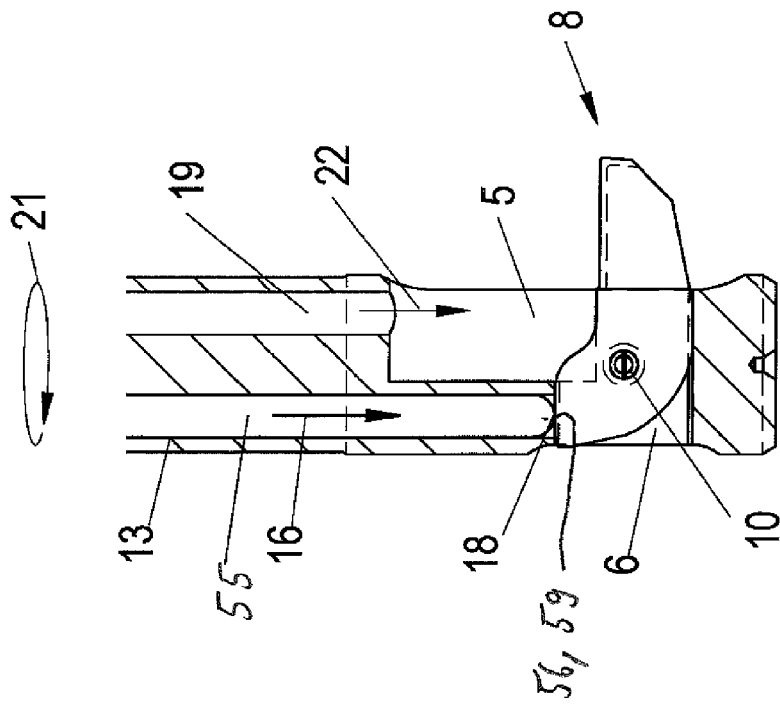
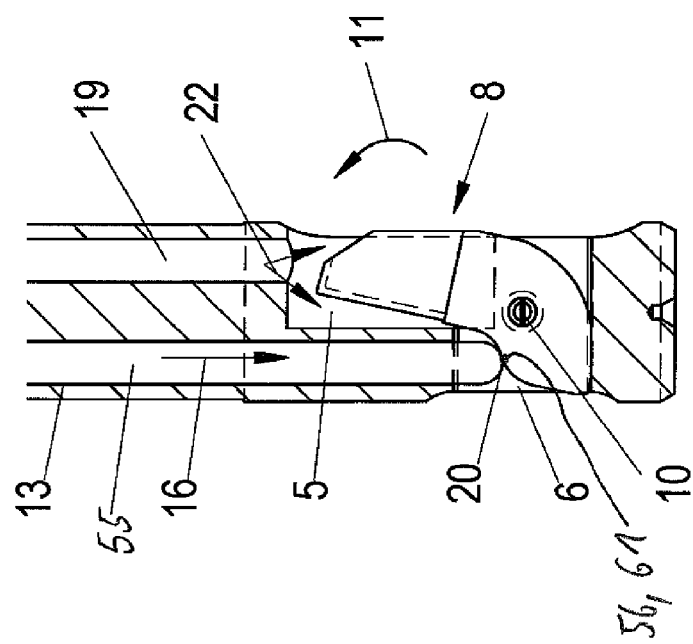

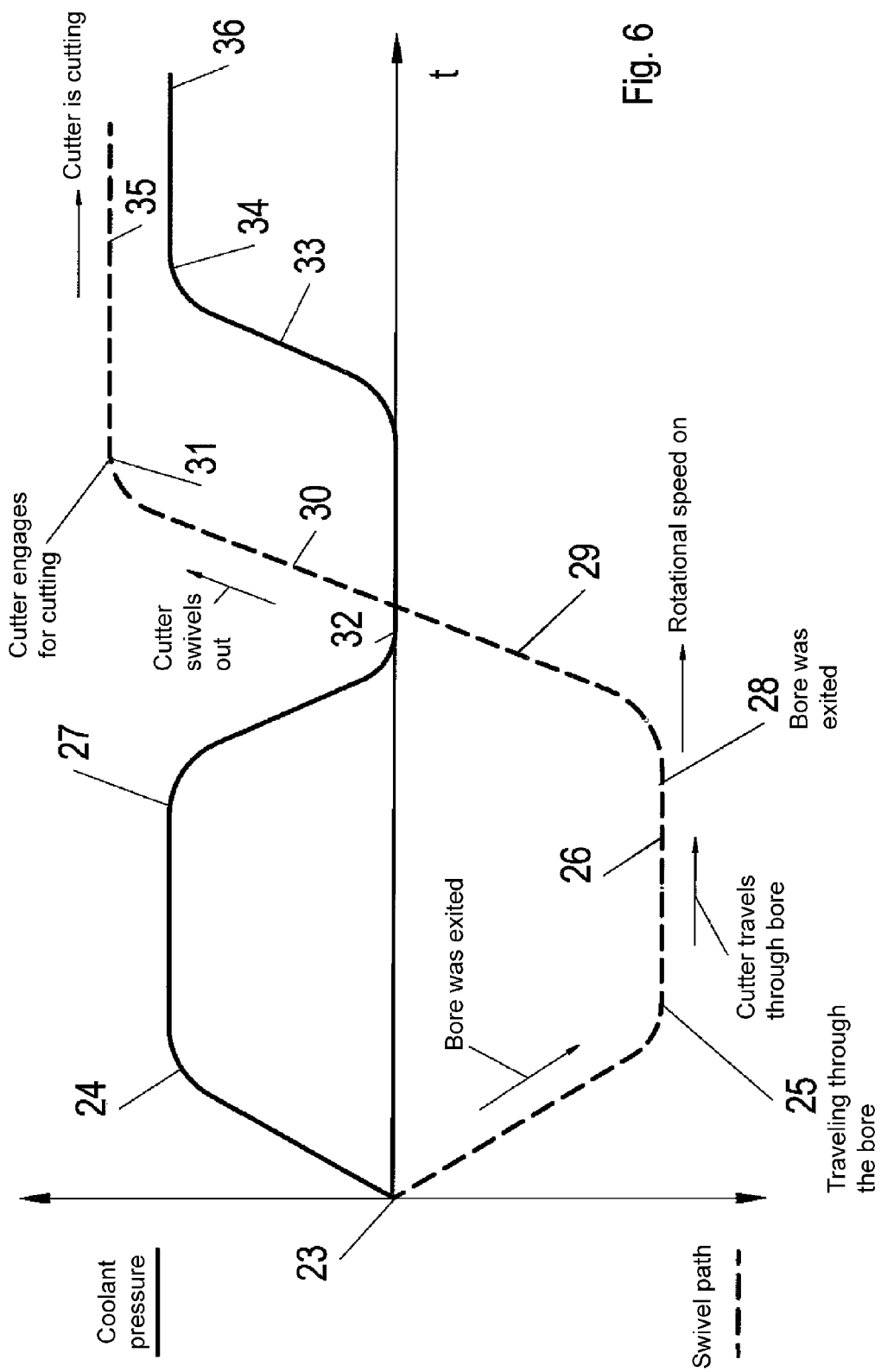

PRESSURE MEDIUM CONTROLLED COUNTERBORE TOOL WITH A PISTON-CYLINDER UNIT

The invention relates to a pressure medium controlled counterbore tool with a piston-cylinder unit pursuant to the generic part of claim 1.

A piston-free, pressure medium controlled counterbore tool has become known from DE 10 2009 012 996 A1 that can be traced back to the same applicant.

With the piston-free, pressure medium controlled counterbore tool pursuant to DE 10 2009 012 996 A1, the cutter is swiveled out by the centrifugal force of the rotating counterbore tool, and the centrifugal force keeps it stable in its swiveled-out position, while the swivel motion that is directed inward, which brings the cutter into a non-cutting passive position is induced by a pressure medium.

The pressure medium, preferably the coolant, flows directly onto an inflow area of the cutter in order to swivel same into the passive, non-cutting position into the cutter housing structure.

Such pressure medium controlled counterbore tool pursuant to DE 10 2009 012 996 A1 has extensively proven itself. It has been shown, however, that the swivel-in force is relatively small and depends particularly on the pressure of the pressure medium, i.e. the coolant, so that an orderly swiveling back of the cutter is not always ensured.

This known pressure medium controlled counterbore tool is remarkable, however, because of its particular simplicity and process safety.

For this reason, the object of the invention is to further develop a counterbore tool pursuant to the subject matter of DE 10 2009 012 996 A1 such that it provides still a further increase in the process safety in the sense that a higher retractive force onto the swiveled-out cutter can be obtained.

To solve this problem, the invention is characterized by the technical teaching of Claim 1.

An essential feature of the invention is that the actuation of the cutter no longer results directly due to the inflow of the pressure medium, but indirectly and mediately by a piston, which itself is actuated by the pressure medium, wherein the displacement of the piston acts on the freely pivotable end of the cutter by means of one or multiple directional control pins or other actuators.

It therefore involves an indirect actuation of the one or the multiple cutters by at least one piston-cylinder unit, which consists of the piston and the directional control pin actuated by the piston.

Instead of the pin-shaped directional control pin, other actuators can also be used, such as a control disk, which is shaped like a cam disk with corresponding cutouts and which with its outer perimeter bears directly against the freely pivotable end of the cutter to transfer the load.

What is significant in this invention is that an indirect actuation of swiveling-in of the cutter is now performed by a piston, which can be displaced by the flow of the pressure medium against it.

The piston is therefore arranged in a cylinder chamber where it is displaceably mounted, wherein the retractive force of the piston is produced by a spring or by another energy storing device.

In a particularly simple embodiment of the invention, it is provided that the spring is designed as a compression spring and is mounted on the directional control pin. With one side it supports itself against a limit stop that is fixed on the housing and keeps the directional control pin at all times spring-loaded in the retracted position against the piston, which is thus likewise pre-loaded in the opposite direction to the inflowing pressure medium.

In another embodiment of the invention it can be provided, however, that the compression spring is not placed around the directional control pin and encompasses the directional control pin, but that the spring is instead designed as a separate component such as a torsion spring, helical compression spring or as elastomeric buffer, which acts against the front edge of the piston. The energy storing device ensures that the piston is retained in its retracted position at all times.

Within the scope of the older patent application DE 10 2009 012 996 A1 it was disclosed that the coolant flow directly flows against the freely pivotable end of the cutter, to make it possible for the cutter to swivel into the cutter housing in this way. The swiveling out of the cutter was therefore essentially caused by centrifugal force.

The present invention is no longer limited to this, because the present invention provides in a refinement that the front free end of the directional control pin or of another actuator, which bears against the freely pivotable end of the cutter, no longer rests loosely on the freely pivotable end, but it is coupled to the cutter articulated and positively.

Such positive coupling can be carried out by means of a flexible joint (ball joint) or also by means of toothing on a gear rack. The front free end of the directional control pin is designed as a gear rack, the teeth of which engage with the back of the cutter which also has teeth, so that the cutter can be swiveled both into the swiveled-out position as well as into the retracted position by the action of the directional control pin.

This therefore involves a desmodromic control of the swivel motions of the cutter, which is actuated by the directional control pin both in the swiveled-out position as well as in the retracted position and is at all times connected with the directional control pin non-positively and positively.

In a preferred embodiment, the present invention describes the retraction of the piston under the spring loading of an energy storing device, although the invention is not limited to this, however.

In another embodiment of the invention, it can also be provided that the retraction of the piston is produced by the action of the coolant.

For this purpose, it is necessary to arrange a valve in the coolant feed duct or pressure medium duct, which acts on different and opposite facing surfaces of the piston.

For this purpose, it is necessary that on one hand the coolant duct exerts pressure on a first piston surface, which pushes the piston ahead in the direction of its active displacement position, whereas the coolant duct is diverted during the changeover of the valve such that the flow against a second piston surface (e.g. the back of the piston) that is opposite the first piston surface returns the piston into its retracted rest position.

It can therefore be seen that the invention is not limited to the arrangement of an energy storage device for retracting the piston, but that the piston can also be retracted into its rest position by the action of diverting a divertible pressure medium.

The advantage of the present invention is that by the indirect swiveling actuation of the cutter with the arrangement of a piston, an actuation surface of the piston exists against which the pressure medium flows, which exerts a significantly greater actuating force onto the cutter. The quantity of the actuating force no longer depends on the pressure of the pressure medium, but is determined decisively by the size of the piston surface.

Compared to a cutter against which the pressure medium flows directly, the actuating force of the cutter can therefore be increased 20-fold.

The contact or actuating force can be changed over a wide range by the design of piston surface which acts against the pressure medium.

This results not simply in the advantage of a safe swiveling actuation of the cutter/cutters, but in addition also provides the possibility that the cutter/cutters can not only be swiveled back into a passive position, but that they can also be swiveled out of the cutter chamber into an active position. If the pressure medium flows directly against the cutter/cutters, the swiveling action in both directions could only be realized with difficulty.

It is advantageous furthermore, if a bypass flow exists in the cylinder chamber containing the piston.

In this way, the advantages of the prior art, that is a continuous flushing of the counterbore tool and above all of the cutter housing, is combined with the advantages according to the invention, because now the invention also provides flushing of the counterbore tool and especially of the cutter housing, accompanied by a significantly larger actuating force of the cutter/cutters.

In a first embodiment it is provided that the piston is arranged non-sealing in the cylinder chamber. The cylinder chamber is therefore oversized compared to the reduced diameter of the piston, which produces an intended bypass flow of the pressure medium along the external perimeter of the piston in the direction of its longitudinal axis through the cylinder chamber.

Likewise, it is possible to arrange grooves which are open on one side and run longitudinally on the inside of the cylinder chamber, and which facilitate the desired bypass flow.

In another embodiment, the piston can have as series of bypass bores on its outer perimeter aligned in the longitudinal direction, so that the pressure medium inflow is not against a piston that is not sealed with respect to the cylinder chamber. A part of the pressure medium flows past the piston via the bypass bores.

It can likewise be provided that even though the piston is arranged sealing (or non-sealing) so that it can be displaced in the cylinder chamber, but that said piston has one or multiple longitudinal holes which penetrate the piston and which produce a bypass flow of the pressure medium through the piston.

In both embodiments, this bypass flow of the pressure medium flows into a bypass bore arranged in the longitudinal direction in the counterbore tool to the front in direction of the cutter chamber. The cutter chamber is therefore flushed via the bypass bore, even though the piston is moved by the pressure of the pressure medium.

The intended leakiness of the piston in the cylinder chamber with the embodiments above has the advantage that any swarf which may have been carried along with the coolant will not result in the seizure of the piston, because this swarf will be flushed out via the bypass bores (or the radial play provided between piston and cylinder wall) past the piston into the bypass bore in the structure and fed into the cutter chamber, from where they exit the counterbore tool again.

On the other hand, the intended leakiness of the piston in the cylinder chamber still has the advantage that a steady coolant flow is used for flushing the cutter housing.

This will ensure a long service life of the piston with low wear, since the piston will not seize in the cylinder chamber due to any swarf that may have been carried along with the coolant. Forced flushing occurs at all times.

The subject of the present invention results not only from the subject matter of the individual Claims, but also from the combination of the individual Claims among one another.

All particulars and features disclosed in the documentation, including the summary, in particular the spatial configuration represented in the drawings, are claimed as being essential to the invention, to the extent that they are new individually or in combination compared to the prior art.

In the following, the invention will be explained in detail by means of drawings which merely illustrate one way of carrying out the invention. In this instance, further features and advantages essential for the invention become apparent from the drawings and their description.

The drawings show:

FIG. 1: Section through a pressure medium controlled counterbore tool

FIG. 2: A horizontal projection onto the face in the direction of arrow II in FIG. 1

FIG. 3: A perspective illustration of the cutter FIG. 4: The counterbore tool pursuant to FIG. 1 with a retracted cutter FIG. 5: The same illustration pursuant to FIG. 4, with the cutter extended FIG. 6: The comparison of a coolant feed in connection with the swivel motion of the cutter during operation FIG. 1 represents a simple form of the counterbore tool 1, which essentially comprises a cylindrical structure 2 that is driven in the direction of its longitudinal center line so that it rotates, and in the embodiment shown, in the direction of arrow 21, for example.

In this context, a feed bore 15 for a pressure medium is arranged inside the structure 2.

For the sake of simplicity, in the following description it is assumed that this pressure medium is a coolant, which is used both to control the pressure medium of the cutter 8 and at the same time for cooling and flushing the cutter chamber 5 and the cutter opening 6.

With the aid of a fixing screw 4, an approximately cylindrical cutter housing 3 is also arranged on the front side of the structure, inside of which runs a longitudinal hole in the form of a control duct 13. This drawing shows that the pressure medium 14 flows in direction of the arrows 16 in this control duct 13.

On the front side of the cutter housing 3, a cutter chamber 5 is arranged, in the upper area of which a bearing bolt 10 is arranged, on which the cutter 8 is positioned so that it swivels in a single direction. A cutter window 6 extends the cutter chamber towards the back, and the upper boundary of the cutter chamber 5 is formed by the face 7 of the cutter housing 3.

In its extended working position, the cutter 8 pursuant to FIG. 1 is in a reverse-cutting procedure, so that the lower cutting edge 9 bears against an edge of the bore (not shown in detail) for cutting and chip removal.

Pursuant to the FIG. 1, the cutter is therefore swiveled into its working position in the direction of arrow 12, whereas in the direction of arrow 11 it is swiveled into its rest position, so that at least the cutting edge 9 will be swiveled into the cutter chamber 5 and the cutter is therefore set into a passive, non-cutting position.

It can be seen in FIG. 1, that the pressure medium 14 flows via the feed bore 15 in the direction of arrow 16 into a cylinder chamber 50, in which a piston 49 is held freely displaceable in a specific position under the spring loading of a compression spring 57.

The retracted position of the piston 49 is a result of being stopped by contact against a stop screw 62 which is screwed transversely into the structure 2, the front free end of which bears against a limit stop 63 of the piston 49.

As soon as the pressure medium 14 acts on the front free face of the piston 49, said piston moves to the right against the spring force of the compression spring 57, wherein the one end of the compression spring 57 bears against a directional control pin 55 on the back of a headpiece 54, whereas the other end of the compression spring 57 bears against a limit stop 58 that is fixed in the housing.

By displacing the piston 49 to the right, a pressure is therefore exerted on the headpiece 54, so that by overcoming the spring force of the compression spring 57, the directional control pin 55 is shifted to the right, wherein its free pin end 56 bears against the pivotable end of the cutter 8 and swivels it.

During this movement of the directional control pin 55 to the right, the cutter 8 is therefore swiveled into the cutter chamber 5 in the direction of arrow 11 and is therefore brought into a passive position.

At the same time it can be seen from the illustration in FIG. 1, that in the absence of the pressure medium 14, the compression spring 57 is relaxed and the piston 49 will be shifted to the left again.

In the absence of the pressure medium 14, the piston 49 is therefore displaced opposite to the direction of the arrow 16, which enables the cutter in order to swivel it about its bearing bolt 10 into its active position in direction of arrow 12, governed by the centrifugal force.

In the general part of the specification it was pointed out that it is not necessary that the pin end 56 bears only loosely against the assigned control surfaces 18, 20 (see FIG. 3) in order to solve the problem.

In another embodiment, which was not illustrated in a drawing, it can actually also be provided that the pin end 56 is directly connected with the freely pivotable end of the cutter 8 by means of a joint, to ensure a swivel-in as well as an active swivel-out of the cutter into a cutting position.

In this way, a positive connection of the directional control pin 55 with the freely pivotable end of the cutter 8 is ensured in both directions.

On the other hand, only a part of the pressure medium flow will directly enter into the cutter chamber 5 via a bypass bore 19 to flush the cutter chamber 5 while at the same time cooling the machining surface of the cutting edge 9 on the assigned edge of the bore. In this way, the cutter chamber 5 and the cutter opening 6 is flushed with the pressure medium 14 during the chip removal process.

In this instance, it is assumed that a series of bypass ducts 51 which run in the longitudinal direction are available in the area of the cylinder chamber 50, 52, which prevent that the piston 49 will be mounted in the cylinder chambers 50, 52 such that it provides a seal, so that the pressure medium can also flow past the piston 49 in order to fill the cylinder chamber 52 with pressure medium, which then flows via the previously mentioned bypass bore 19 into the cutter chamber 5.

Instead of the bypass ducts, it can simply be provided that the piston in the cylinder chamber 50, 52 will be undersized, so that said piston is arranged in the cylinder chamber 50, 52 with an undersize, in order to ensure a displacement leaving some play and at the same time ensure that the pressure medium 14 can also flow past the piston 49 into the cylinder chamber 52, in order to get from there into the bypass bore 19.

At the same time, the pressure medium 14 will also get into the longitudinal hole 13 in which the directional control pin 55 is displaceably mounted. In this way, the directional control pin 55 will be lubricated and flushed. The pressure medium 14 will also be directed via the pin end 56 on the directional control pin 55 to the control surfaces 18, 20 on the cutter 8, and flushes these.

FIG. 2 shows the front elevation of the entire arrangement, from which it can be seen that in its working position the cutter 8 is swiveled out from the cutter chamber 5.

FIG. 3 shows a perspective illustration of the cutter 8, from which it can be seen that the cutting edge 9 is arranged in the area of a cutting surface and that there are a total of two control surfaces 18, 20 that are contacted by the pin end 56 of the directional control pin 55.

Besides, it can be seen from FIG. 3, that in the drawing of the embodiment pursuant to FIG. 1, in which the pin end 56 of the directional control pin 55 merely bears against the freely pivotable end of the cutter 8, that this pin end 56 during the swiveling of the cutter 8 travels a path from position 59 to position 61 in the direction of arrows 11, 12.

Therefore a movement of the pin end 56 occurs from position 59 to position 61 in the direction of arrow 60.

By designing the control surface 20 such that it is approximately arched or cambered, the swiveling characteristics and the retraction behavior of the cutter 8 can be changed over a wide range.

The control surface 20 can be designed more or less cambered, it can also have concave intermediate areas or convex elevated areas, which can result in a change of the swiveling-in characteristics of the cutter 8 as the case may be.

For this purpose, the control surface 18 is preferably designed level. But it can also be designed cambered or convex or concave, however.

Instead of a lose contact of the headpiece 54 of the directional control pin 55 on the front piston base 53 of the piston 49, a joint can also be arranged here, in order to obtain a connection between the headpiece 54 and the piston 49 in this way.

Instead of a joint, also a rigid connection, such as a bolted connection, can be provided.

In another embodiment, the pin end can be designed as gear rack with external toothing that engages with an assigned toothing on cutter 8.

It can equally be provided that the piston 49 is integrally connected with the directional control pin 55 using the same material and thus forms a single continuous piece.

FIGS. 4 and 5 show that the front end 56 of the bolt of the directional control pin 55 respectively acts on the control surfaces 18, 20 that are arranged spaced apart, in order to retract the cutter into the cutter chamber 5 either in direction of arrow 11 as shown in FIG. 4 or to keep the cutter in the position as illustrated in FIG. 5, wherein on this occasion, the cutter 8 is extended by centrifugal force If a flexible connection or a toothing or a solid connection exists between the pin end 56 and the freely pivotable part of the cutter 8 pursuant to FIGS. 4 and 5, however, it is possible to swivel the cutter 8 into the cutter chamber 5 by the action of the directional control pin 55 of the piston-cylinder unit both in the direction of arrow 11 as well as swivel it out of the cutter housing 5 in direction of arrow 12 and bring it into the position illustrated in FIG. 5.

FIG. 6 illustrates a typical sequence of motions in the form of a flowchart during the actuation of the cutter 8.

The coolant pressure is plotted upwards on the ordinate, while the swivel path of the cutter is plotted downward on the ordinate.

In FIG. 6, the swivel path pointing down represents the retracted position of the cutter, while the swivel path pointing up (positive values of the swivel path) represents the extended position of the cutter.

Starting off from position 23, it is initially assumed that both no coolant pressure exists and that the cutter is in an undefined intermediate position.

In the curve branch between position 23 and 24, the pressure medium is switched on and now the pressure medium acts on the pressure surface 18 in direction of arrow 16, so that in the range of the curve branch between 23 and 25 the cutter is retracted and in position 25 has reached its fully retracted position.

In the transition between position 25 and position 26, the cutter then travels through the bore, wherein the coolant pressure between positions 24 and 27 is maintained.

Starting from position 28, the cutter in its retracted position travels out of the bore and reaches the rear edge of the bore.

For that reason, the coolant is switched off at position 27 and has lost all of its pressure when reaching position 32.

Because there no longer is any pressure load on the cutter 8, in position 29 the cutter is swiveled out due to centrifugal force when the rotary actuator of the counterbore tool is started and then travels out of the cutter chamber 5 due to the centrifugal force, so that now it starts its swivel-out path at position 32 in the curve branch 30, where values are positive.

The swiveling out continues up to position 31, wherein it is essential that coolant pressure no longer exists in this position in order to achieve complete swivel-out.

At position 31, the cutter 8 will contact a workpiece that is not illustrated in detail for metal cutting and above curve branch 33, the coolant pressure is raised to its maximum until position 34, so that a complete coolant feed is available after the metal cutting starts.

The actual working position of the cutter now occurs in the position between 34, 35 and 36, where said cutter will be in contact with the workpiece that is not illustrated in detail for metal cutting.

After the metal cutting process has been completed, the cutter 8 will be swiveled back into the cutter chamber 5 in the same manner.

The coolant pressure should therefore be as low as possible at position 31, in order to bring the cutter into a stable, swiveled-out position.

After the completion of the metal cutting operation, the entire procedure is performed the same in reverse, i.e. then the coolant is initially removed, then the cutter will no longer contact the workpiece for metal cutting, then the rotary actuator of the counterbore tool is stopped, thereafter the coolant is switched on and the cutter folds into the cutter opening 6 and thereafter the counterbore tool with the cutter 8 swiveled into the cutter housing 3 is retracted again through the through-hole.

Drawing Legend

1 Counterbore tool
2 Structure
3 Cutter housing
4 Fixing screw
5 Cutter chamber
6 Cutter opening
7 Face
8 Cutter
9 Cutting edge
10 Bearing bolt
11 Direction of arrow
12 Direction of arrow
13 Longitudinal hole
14 Pressure medium
15 Feed bore
16 Direction of arrow
17 Bore
18 Control surface
19 Bypass bore
20 Control surface
21 Direction of rotation
22 Direction of arrow
23 Position
24 Position
25 Position
26 Position
27 Position
28 Position
29 Position
30 Curve branch
31 Position
32 Position
33 Curve branch
34 Position
35 Curve branch
36 Curve branch
49 Piston
50 Cylinder chamber
51 Bypass duct
52 Cylinder chamber
53 Piston base
54 Headpiece (of 55)
55 Directional control pin
56 Pin end (of 55)
57 Compression spring
58 Limit stop
59 Position
60 Direction of arrow
61 Position
62 Stop screw
63 Limit stop

The invention claimed is:

1. A pressure medium controlled counterbore tool with one or multiple cutters, which can be actuated in their swivel position by supplying a pressure medium, wherein the actuation of said at least one cutter is performed by means of at least one piston-cylinder unit that is actuated by the pressure medium, and said cutter can alternatively be swiveled out of a cutter chamber of a cutter housing by centrifugal forces, and wherein the piston-cylinder unit has at least one control pin with a pin end which can be applied to an end of the cutter to swivel the cutter into the cutter chamber, wherein the at least one cutter is supported eccentrically on a bearing bolt.

2. The counterbore tool according to claim 1, wherein the pressure medium controls the swivel motion of the cutter by means of actuating the piston-cylinder unit and ensures the flushing and cooling of the cutter by means of at least one bypass bore arranged in the longitudinal direction of the counterbore tool.

3. The counterbore tool according to claim 1 or 2, wherein the counterbore tool comprises a single pivoted cutter on a front of the cutter housing so that it can be swiveled.

4. The counterbore tool according to claim 1, wherein the counterbore tool comprises multiple cutters which are arranged side-by-side or on top of each other and which are driven by an assigned piston-cylinder unit so that they can be respectively swiveled out and swiveled in.

5. The counterbore tool according to claim 1, wherein the cutter is held spring-loaded in its retracted rest position and/or in its extended work position.

6. The counterbore tool according to claim 5, wherein the spring-loaded holding is performed by a compression spring, which exerts a spring load onto the control pin to keep it against a piston of the piston-cylinder in the retracted position, which as a result is pre-loaded against the pressure medium flowing in.

7. The counterbore tool according to claim 1, wherein the cutter is swiveled-out with centrifugal force and/or spring force and the cutter is swiveled-in by the piston-cylinder unit.

8. The counterbore tool according to claim 1, wherein the cutter is swiveled-in and swiveled-out by actuation of the piston-cylinder unit.

9. The counterbore tool according to claim 1, wherein the pressure medium can be switched over between a first control duct and a second control duct with a changeover valve, in order to actuate the piston-cylinder unit in both directions and to retract or extend the cutter optionally.

10. The counterbore tool according to claim 1, wherein the piston is undersized and is mounted displaceably movable in a cylinder chamber and that as a result a bypass flow of the pressure medium flushes a longitudinal hole past on the perimeter of the piston, in which the control pin is mounted displaceably.

\* \* \* \* \*